United States Patent
Cox et al.

(10) Patent No.: US 8,892,582 B2
(45) Date of Patent: Nov. 18, 2014

(54) METHOD AND SYSTEM FOR IDENTIFYING OBJECTS OF SERVICE

(75) Inventors: Brian Cox, Galway (IE); Brian Murphy, Galway (IE)

(73) Assignee: Hewlett-Packard Development Company, L.P., Houston, TX (US)

( * ) Notice: Subject to any disclaimer, the term of this patent is extended or adjusted under 35 U.S.C. 154(b) by 1926 days.

(21) Appl. No.: 11/885,409

(22) PCT Filed: Mar. 3, 2005

(86) PCT No.: PCT/EP2005/050960
§ 371 (c)(1),
(2), (4) Date: Jan. 18, 2008

(87) PCT Pub. No.: WO2006/094553
PCT Pub. Date: Sep. 14, 2006

(65) Prior Publication Data
US 2008/0140658 A1    Jun. 12, 2008

(51) Int. Cl.
*G06F 7/00* (2006.01)
*H04L 12/24* (2006.01)

(52) U.S. Cl.
CPC .......... *H04L 41/0233* (2013.01); *Y10S 707/94* (2013.01)
USPC .......................................... 707/758; 707/940

(58) Field of Classification Search
USPC ................................. 707/758, 940
See application file for complete search history.

(56) References Cited

U.S. PATENT DOCUMENTS

| | | | | |
|---|---|---|---|---|
| 5,638,492 A | * | 6/1997 | Maeda et al. | 706/45 |
| 5,870,763 A | * | 2/1999 | Lomet | 707/202 |
| 5,995,753 A | * | 11/1999 | Walker | 717/108 |
| 6,118,874 A | * | 9/2000 | Okamoto et al. | 380/282 |
| 2002/0161749 A1 | * | 10/2002 | Pratt | 707/3 |
| 2005/0091236 A1 | * | 4/2005 | Muno et al. | 707/100 |

OTHER PUBLICATIONS

Rob, "Database Systems: Design, Implementation, and Management," Boyd & Fraser Publishing Company, 1995, pp. 358-359 and 427-429.
"Services for Computer Supported Telecommunications Applications (CSTA) Phase 1," Standard ECMA-179, Online, Jun. 1992, http://www.ecma-international.org/publications/files/ECMA-ST/Ecma-179.pdf.

* cited by examiner

*Primary Examiner* — Cheyne D Ly
(74) *Attorney, Agent, or Firm* — Richard Graham Lloyd

(57) ABSTRACT

A method and system and related computer program products are described for identifying an object of service comprising the initial step of generating and storing a static composite identifier representing a state of the object of service. Then, whenever it is desired to identify the object of service, the steps are carried out of: generating a dynamic composite identifier representing a current state of the object of service; locating and retrieving the stored static composite identifier, and searching a database for a match with an object of service recorded therein using either the static or the dynamic composite identifiers, or both.

17 Claims, 2 Drawing Sheets

METHOD AND SYSTEM FOR IDENTIFYING OBJECTS OF SERVICE

FIELD OF THE INVENTION

The invention relates to identifying objects of service in, for instance, a computing system.

BACKGROUND OF THE INVENTION

In modern computing infrastructures it is useful to be able to uniquely identify an object of service. In this application, the term "object of service" will be used to refer to any separately characterisable element within the infrastructure upon which a service, or set of services (such as support, maintenance or system management services, for instance) is remotely delivered. Examples of objects of service could be, for instance, computer systems, operating system instances, hardware devices, or applications. It is also useful to keep track of such objects of service over time and across changes to some or all of the underlying identifiers used to distinguish one object of service from other objects of service within the same data processing infrastructure.

This is particularly useful when data relating to, or associated with, one or more objects of service is stored in one or more remote data repositories over a long period of time.

In addition, if data from many objects of service are stored in more than one data repository, it is useful to be able to correctly identify an object of service uniquely across the multiple data repositories so that data from multiple objects of service are not mixed up.

If information from an object is stored or used remotely from the object of service it is often useful, or indeed essential, to be able to identify the source of the data. If an object must be tracked over a period of time then it is useful to be able to connect new data from that object to previous data from the same object.

Depending on the use of the data, it can also be useful to be able to associate data from an object as it exists today with the state of the same or equivalent object at some point in time in the past. If this is not catered for then existing objects could become orphaned as their identifiers change over time and 'new' objects will be created unnecessarily, leading to a proliferation of objects and the fragmentation of historical data relating to the objects of service.

This invention is directed to the provision of one or more of the facilities referred to above.

SUMMARY OF THE INVENTION

In brief, this is achieved by a method for identifying an object of service comprising the initial step of generating and storing a static composite identifier representing a state of the object of service. Then, whenever it is desired to identify the object of service, the steps are carried out of: generating a dynamic composite identifier representing a current state of the object of service; locating and retrieving the stored static composite identifier; and searching a database for a match with an object of service recorded therein using either the static or the dynamic composite identifiers, or both.

In at least preferred embodiments, the method comprises recording in the database at least the generated dynamic composite identifier in association with the identified object of service.

The static and/or dynamic identifiers are preferably human inspectable and can comprise, or at least be derived from, a set of parameters that may include, for instance, both physical and human and/or network assigned parameters related to the object of service or logical identifiers from the OS, network configuration, application, cluster or the like. It will be understood that the combination of identifiers that may be used is highly flexible. The static and dynamic composite identifiers can comprise the same set of parameters and be generated using the same program, for instance.

The techniques described above are primarily envisaged for an arrangement where the steps of generating and storing the static composite identifier, generating the dynamic composite identifier and locating and retrieving the stored static composite identifier are carried out by program code elements executable within the object of service itself and the step of searching a database to identify the object of service is carried out in a server remote from the object of service, the static and/or dynamic identifiers being transmitted over a network. It will be understood however that the identifiers could in some embodiments be communicated manually, or via telephone, or even between elements running within the same host, for instance.

Other aspects of the invention provide a system for identifying objects of service, and computer program products for participating in the above described methods.

BRIEF DESCRIPTION OF THE INVENTION

An embodiment of the invention will now be described, by way of non-limiting example, with reference to the accompanying drawings, in which FIG. 1 is a highly schematic diagram illustrating a remote support arrangement;

DESCRIPTION OF AN EMBODIMENT OF THE INVENTION

Figure 1:
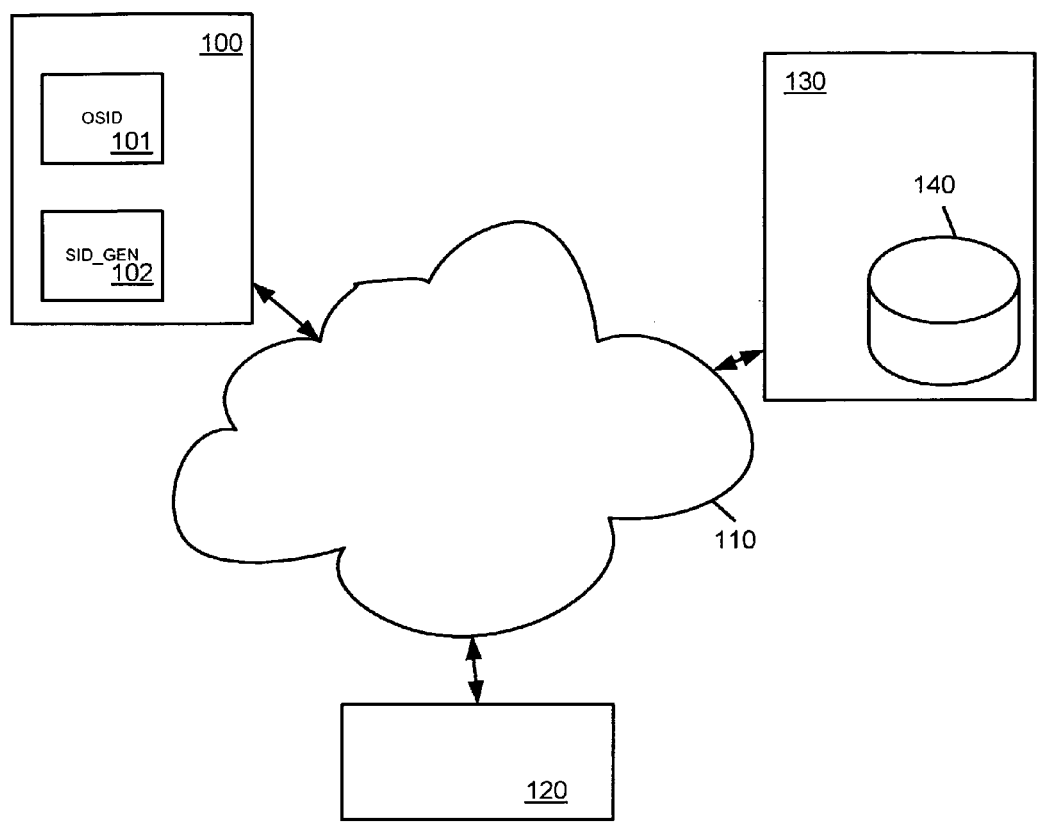

FIG. 1 is a highly schematic diagram illustrating a basic embodiment of the invention in the context of a remote support arrangement. As shown in FIG. 1, an object of service 100 is connected via network 110 to a support server 120. Also connected to network 110 is a Global ID server 130. Global ID server has access to a database 140. Database 140 is illustrated in FIG. 1 as forming part of Global ID server 130, but it will of course be understood that it could equally take the form of one or more database servers also connected to network 110. It will be further understood that although only a single object of service 100 and a single support server 120 is shown in FIG. 1, real-world implementations of the invention would normally include a very large number of objects of service 100 of different kinds and multiple support servers 120 that may each be connected to a wide variety of back-end support systems.

The purpose of Global ID server 130 is to provide an identification service for objects of service 100 that can be used as a facility by support servers, such as support server 120 in order to identify objects of service 100 to which it provides services. The nature of the services provided by, or with the aid of, support server 120 to object of service 100 are not especially germane to the techniques to be described here, but the services could, for instance, be remote software or hardware maintenance services or customer support services. For the purpose of illustration, each object of service 100 is assumed to be associated with a global identifier that will be referred to in the description as the OOS_ID, although it will be understood that more complex arrangements are possible. The support server 120 can use the OOS_ID to associate the services being delivered with other elements or information available to or required by it, such as a customer account or other earlier or concurrent services being provided or with events occurring within the system, for instance.

Instead of relying on a single physical, assigned or randomly generated identifier or a single set of such identifiers to identify the objects of service 100, Global ID server 130 employs two composite identifiers. These two composite identifiers each comprise a set of identifiers that are discernable from the object of service 130 and will be referred to below as the OSID—shown at 101 in FIG. 1—and the CSID (not shown in FIG. 1). OSID 101 is an essentially static element and is stored, for instance, in a file in the object of service 100 and is expected to remain there unchanged over a relatively long period of time. The CSID, on the other hand, is generated dynamically each time it is required. The CSID and OSID are generated by a program that will be referred to as SIDGEN—shown at 102 in FIG. 1. The basic role of Global ID server 130 is therefore to return an OOS_ID as a function of a given received OSID/CSID combination. In some embodiments the structure and fields of the OSID and CSID port system 120—step 402. The received CSID is then stored in the database record corresponding to OOS_ID for future use—step 403.

The OSID is static in the sense that it reflects the values of the chosen set of identifiers at a particular point in time. It is only created for an object of service if one does not already exist. Once it is created on a system it is normally never changed, but it may be recreated if deleted.

The CSID is created on demand and reflects the current values of a set of chosen identifiers. It is not normally cached or otherwise stored on the system to ensure that it is always current.

In preferred embodiments, the structure of the OSID and CSID are similar and they both use the same set of identifiers. It would be possible for the OSID and CSID to have different structures. Thus, in preferred embodiments, the OSID and the CSID will initially normally be identical since the OSID is generated, if necessary, during the process of requesting a CSID.

An example of an OSID and a CSID upon creation of an OSID is shown in Table I. It can be seen that the values are identical.

TABLE I

| Parameter | OSID Value | CSID Value |
| --- | --- | --- |
| Service Agreement ID | 103096397308 | 103096397308 |
| UserApprovedSerialNum | USR43034YS | USR43034YS |
| AutoDetectedSerialNum | USR43034YS | USR43034YS |
| SystemIdent | Z3e109d49737afb26 | Z3e109d49737afb26 |
| SystemModel | HP 9000/800/S16K-A | HP 9000/800/S16K-A |
| HPID | 0 | 0 |
| SPID | −1 | −1 |
| ISEEGuid | | |
| FQDN | Rp9201.atlantico.fab.dk | Rp9201.atlantico.fab.dk |
| MacAddress | 0x00306E0A80E5 | 0x00306E0A80E5 |
| IP Address | 10.1.218.126 | 10.1.218.126 |
| Cluster Alias | | |
| TimeStamp | May 10, 2004 02:16:39 | May 10, 2004 02:16:39 |
| OS Name + Version | HP-UX B.11.11 U | HP-UX B.11.11 U |
| MC3Version | v1.0.0 build 222 | v1.0.0 build 222 | may change over time. It is further possible to store several OSIDs on a single operating system host in order to track multiple objects of service associated with that host.

Figure 2:
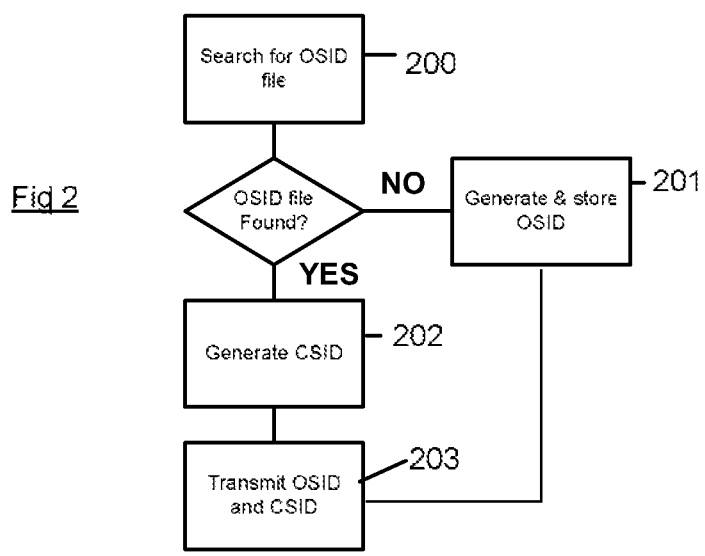
FIG. 2 shows the basic operation of the SIGGEN program shown in FIG. 1.

The basic operation of the SIDGEN program is shown in FIG. 2. In the preferred embodiments, the SIDGEN program may be invoked by an agent running on the object of service 100 and sends data to support server 120, although it will be understood that many other arrangements are possible. When invoked SIDGEN first searches for an existing OSID file—step 200. If no OSID file is found a new one is created—step 201. If an OSID file is found it is retrieved and, in both cases, a CSID is generated—step 202—and both are sent to support server 120—step 203.

Figure 3:
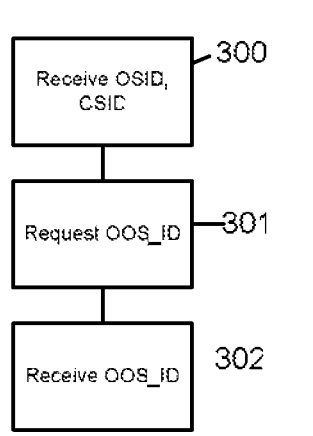
FIG. 3 illustrates the operation of a support server.

FIG. 3 illustrates the operation of the support system 120. Support server 120 receives the OSID and CSID in step 300 and transmits them to Global ID server 130 in step 301. It then receives an OOS_ID in step 302.

Figure 4:
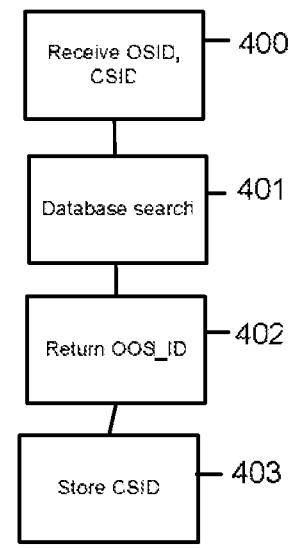
FIG. 4 illustrates the operation of a Global ID server.

FIG. 4 illustrates the operation of Global ID server 130. Global ID server 130 receives OSID and CSID in step 400, performs a database search and/or matching operation in step 401 to identify the OOS_ID and returns the OOS_ID to sup- The identifiers included in the OSID and/or CSID will, of course depend on the nature and type of the object of service and the circumstances, and could generally include a mix of user and/or network defined parameters and hardware and software related parameters that may be available through whatever instrumentation or other interfaces are available to the SIDGEN program. Some or all of these parameters may change over time for a given object of service.

It is preferred that the OSD and CSID be stored and/or transmitted in a human-inspectable form, so that if Global ID server 130 is unable to automatically determine a match, then human judgement may be reverted to. However, use of any suitable digested form of the identifier sets is not excluded and may be preferred in some circumstances.

Thus, over time, as object of service 100 evolves in various ways, some of the identifier values that go into the OSID and CSID will inevitably change. However, since the OSID is not modified, a link with the past is maintained. Table II illustrates the situation where the object of service 100 has changed its MAC and IP addresses, for instance following a hardware change.

TABLE II

| Parameter | OSID Value | CSID Value |
|---|---|---|
| Service Agreement ID | 103096397308 | 103096397308 |
| UserApprovedSerialNum | USR43034YS | USR43034YS |
| AutoDetectedSerialNum | USR43034YS | USR43034YS |
| SystemIdent | Z3e109d49737afb26 | Z3e109d49737afb26 |
| SystemModel | HP 9000/800/S16K-A | HP 9000/800/S16K-A |
| HPID | 0 | 0 |
| SPID | −1 | −1 |
| ISEEGuid | | |
| FQDN | Rp9201.atlantico.fab.jk | Rp9201.atlantico.fab.jk |
| MacAddress | 0x00306E0A80E5 | 0002A5DA69CF0000 |
| IP Address | 10.1.218.126 | 10.65.160.222 |
| Cluster Alias | | |
| TimeStamp | May 10, 2004 02:16:39 | Jul. 2, 2004 01:34:32 |
| OS Name + Version | HP-UX B.11.1 1U | HP-UX B.11.1 1U |
| Version | v1.0.0 build 222 | v1.0.0 build 222 |

TABLE III

| Parameter | OSID Value | CSID Value |
|---|---|---|
| Service Agreement ID | 103096397308 | 103096397308 |
| UserApprovedSerialNum | USR43034YS | USR43034YS |
| AutoDetectedSerialNum | USR43034YS | USR43034YS |
| SystemIdent | Z3e109d49737afb26 | Z3e109d49737afb26 |
| SystemModel | HP 9000/800/S16K-A | HP 9000/800/S16K-A |
| HPID | 0 | 0 |
| SPID | −1 | −1 |
| ISEEGuid | | 02140500-0504-1231-0200-193743952600 |
| FQDN | Rp9201.atlantico.fab.jk | Rp9201.atlantico.fab.jk |
| MacAddress | 0x00306E0A80E5 | 0002A5DA69CF0000 |
| IP Address | 10.1.218.126 | 10.65.160.222 |
| Cluster Alias | | |
| TimeStamp | May 10, 2004 02:16:39 | Jul. 2, 2004 01:34:32 |
| OS Name + Version | HP-UX B.11.11 U | HP-UX B.11.11 U |
| Version | v1.0.0 build 222 | v1.0.0 build 222 |

Table III illustrates the situation where a parameter is added to the CSID that was not available when the OSID was generated. In this simple example, this could be, for instance, because the functionality that serves to generate this identifier—denoted ISEE—was not installed or operational when the OSID was generated.

TABLE IV

| Parameter | OSID Value | CSID Value |
|---|---|---|
| Service Agreement ID | 103096397308 | 103096397308 |
| UserApprovedSerialNum | USR43034YS | USR43034YS |
| AutoDetectedSerialNum | USR43034YS | |
| SystemIdent | Z3e109d4945737afb26 | S-1-5-21-1609621809-1855586357-7585522 |
| SystemModel | HP 9000/800/S16K-A | HP 9000/800/S32K-A |
| HPID | 0 | 0 |
| SPID | −1 | −1 |
| ISEEGuid | | |
| FQDN | Rp9201.atlantico.fab.jk | elcrane.h.w2k4 |
| MacAddress | 0x00306E0A80E5 | 0008C78F0FD10000 |
| IP Address | 10.1.218.126 | 10.65.134.99 |
| Cluster Alias | | |
| TimeStamp | May 10, 2004 02:16:39 | Jul. 21, 2004 21:42:55 |
| OS Name + Version | HP-UX B.11.11 U | HP-UX B.11.23 U |
| Version | v1.0.0 build 222 | v1.0.0 build 222 |

Table IV illustrates the situation where many parameters have changed.

If the OSID is unchanged then the database search step 401 may simply look for an exact match with the OSID to determine the OOS_ID. However, eventually, it is probable that the OSID will be deleted for one reason or another. A new OSID will be created by the SIDGEN program the next time a CSID is requested. The new OSID will match the new CSID but it could be quite different to the previous OSID. However, it should be quite close to the last CSID received from the same system and that was recorded in step 403, since CSIDs that have been associated with a given OOS_ID are constantly being recorded within Global ID server 130.

Thus, a search can be performed in Global ID server 130 against existing CSIDs to find the closest match and thereby re-establish the link to the earlier OSID and the complete history for this object of service 100.

Depending on the identifiers selected for the OSID and CSID and the matching accuracy requirements a complete, partial or fuzzy search can be used within Global ID server 130 in step 401 against the set of identifiers to find the best matched OOS_ID for a given OSID/CSID combination. It will be understood that many different techniques would be available for this.

By providing a common global identification of objects of service this solution allows data to be shared between many back-end support servers and services and potentially enables existing support infrastructures to be used more effectively.

In addition, tracking and measurement of services provided and or observed phenomena, such as failure rates or event patterns, is facilitated since they can be associated with a common global OOS_ID more reliably.

Moreover, this approach is well adapted to servicing virtualized elements within IT environments (e.g. virtual machines—operating systems and services, adaptive enterprises, etc), since objects of service may be virtual machines or operating system instances and the precise link between any individual identifier that may be available and any particular underlying hardware or instrumentation interface may be unreliable or difficult to determine. It will be understood that in modern data processing infrastructures, such virtualised objects of service may migrate from one physical system to another.

Using static and dynamic composite identifiers as described above, it is more likely that a reliable link with an OOS_ID be made possible over a long period of time.

It will be appreciated that commercialised forms of the present embodiment would in practice take the form of a set of computer programs adapted to run on general or special purpose operating environments such as are provided by the Linux, HP-UX or Microsoft Windows operating systems, for instance, and their related programming libraries and tools. These programs may be marketed in the form of suitably coded computer program products including program code elements that implement the functionality described. It will be appreciated though that the techniques described may equally be implemented as special purpose hardware or any combination of software, hardware and/or firmware.

The above discussion is meant to be illustrative of the principles and various embodiments of the present invention. Numerous variations and modifications in each of the illustrated examples will become apparent to those skilled in the art once the above disclosure is fully appreciated. It is intended that the following claims be interpreted to embrace all such variations and modifications.

The invention claimed is:

1. A method for identifying an object of service, comprising:
   generating and storing a static composite identifier representing a first set of values associated with the object of service at a first time, the static composite identifier to remain constant during a lifetime of the static composite identifier; and,
   whenever it is desired to identify the object of service:
      generating, with a processor, a dynamic composite identifier representing a second set of values associated with the object of service at a second time later than the first time;
      locating the stored static composite identifier; and
      transmitting the static composite identifier and the dynamic composite identifier to a server for use in searching a database for a global identifier corresponding to the object of service.

2. A method as claimed in claim 1 further comprising storing the dynamic composite identifier in the database in association with the global identifier corresponding to the object of service.

3. A method as claimed in claim 1 wherein at least one of the static identifier or the dynamic identifier is human inspectable.

4. A method as claimed in claim 1 wherein the first set of values includes at least one of physical human or network assigned parameters related to the object of service.

5. A method as claimed in claim 1 wherein the static and dynamic composite identifiers are generated in the same way.

6. A method as claimed in claim 1 wherein transmitting further comprises transmitting at least one of the static identifier or the dynamic identifier over a network.

7. A method as claimed in claim 1 wherein generating and storing the static composite identifier, generating the dynamic composite identifier and locating the stored static composite identifier are performed by program code elements executable within the object of service.

8. A method as claimed in claim 1 wherein the server is remote from the object of service.

9. A method as claimed in claim 1 wherein the object of service comprises at least one of a computer system, an operating system instance, a hardware device, or an application.

10. A system for identifying an object of service, comprising:
   a generator to generate a static composite identifier representing a first set of values associated with the object of service at a first time, the static composite identifier to remain constant during a lifetime of the static composite identifier, the generator to,
   whenever it is desired to identify the object of service, generate a dynamic composite identifier representing a second set of values associated with the object of service at a second time different from the first time;
   a first server remote from the object of service to receive the static composite identifier and the dynamic composite identifier and to search a database for a global identifier corresponding to the object of service recorded therein; and
   a second server to transmit the static composite identifier and the dynamic composite identifier to the first server and to receive the global identifier corresponding to the object of service from the first server.

11. A system as claimed as claimed in claim 10 wherein the first server is to store the generated dynamic composite identifier in association with the identified object of service in the database.

12. A non-transitory computer storage medium having instructions stored thereon that, when executed, cause a machine to:
   generate and store a static composite identifier representing a first set of values associated with the object of service at a first time, the static composite identifier to remain constant during a lifetime of the static composite identifier; and,
   whenever it is desired to identify the object of service:
      generate a dynamic composite identifier representing a second set of values associated with the object of service at a second time different from the first time;
      locate the stored static composite identifier; and
      transmit the static composite identifier and the dynamic composite identifier to a server for use in searching a database for a global identifier corresponding to the object of service recorded therein.

13. A non-transitory computer storage medium as defined in claim 12 wherein the dynamic composite identifier is stored in the database in association with the global identifier corresponding to the object of service.

14. A non-transitory computer storage medium as defined in claim 12 wherein the instructions, when executed, cause a machine to in response to determining that the static composite identifier was deleted, replace the static composite identifier associated with the object of service with the current dynamic composite identifier.

15. A non-transitory computer storage medium as defined in claim 12, wherein the generating of the static composite identifier, the generating of the dynamic composite identifier, and the locating of the stored static composite identifier are performed within the object of service.

16. A method as defined in claim 1 further comprising, in response to determining that the static composite identifier is not present in the database, replacing the static composite identifier associated with the object of service with the current dynamic composite identifier.

17. A system as defined in claim 10 wherein the generator is to replace the static composite identifier associated with the object of service with the current dynamic composite identifier in response to determining that the static composite identifier is not present in the database.

* * * * *

UNITED STATES PATENT AND TRADEMARK OFFICE
CERTIFICATE OF CORRECTION

| | | |
|---|---|---|
| PATENT NO. | : 8,892,582 B2 | Page 1 of 1 |
| APPLICATION NO. | : 11/885409 | |
| DATED | : November 18, 2014 | |
| INVENTOR(S) | : Brian Cox et al. | |

It is certified that error appears in the above-identified patent and that said Letters Patent is hereby corrected as shown below:

In the Claims

In column 8, line 49, in Claim 11, delete "as claimed as claimed" and insert -- as claimed --, therefor.

Signed and Sealed this
Twelfth Day of May, 2015

Michelle K. Lee
*Director of the United States Patent and Trademark Office*